United States Patent
Tomita

(10) Patent No.: US 11,830,492 B2
(45) Date of Patent: Nov. 28, 2023

(54) IMAGE PROCESSING APPARATUS, IMAGE FORMING APPARATUS, CONFIDENTIAL INFORMATION MANAGEMENT METHOD, AND RECORDING MEDIUM

(71) Applicant: Konica Minolta, Inc., Tokyo (JP)

(72) Inventor: Atsushi Tomita, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/579,167

(22) Filed: Jan. 19, 2022

(65) Prior Publication Data
US 2022/0139397 A1 May 5, 2022

Related U.S. Application Data

(62) Division of application No. 16/401,544, filed on May 2, 2019, now abandoned.

(30) Foreign Application Priority Data

May 16, 2018 (JP) ................................ 2018-094196

(51) Int. Cl.
*G10L 15/22* (2006.01)
*G06F 3/041* (2006.01)
(Continued)

(52) U.S. Cl.
CPC ............ *G10L 15/22* (2013.01); *G06F 3/0412* (2013.01); *G06F 3/0416* (2013.01); *G06F 3/167* (2013.01)

(58) Field of Classification Search
CPC ........ G06F 21/30; G06F 21/31; G06F 21/316; G06F 21/33; G06F 21/335; G06F 21/42;
(Continued)

(56) References Cited

U.S. PATENT DOCUMENTS 5,774,525 A * 6/1998 Kanevsky ............... G06F 21/31
713/182
6,731,731 B1 5/2004 Ueshima
(Continued)

FOREIGN PATENT DOCUMENTS

| CN | 1932754 A | 3/2007 |
| CN | 103152505 A | 6/2013 |

(Continued)

OTHER PUBLICATIONS

Decision of Rejection issued in corresponding Chinese Patent Application No. 201910408984.X dated Jan. 10, 2022 (23 pages).
(Continued)

*Primary Examiner* — Leshui Zhang
(74) *Attorney, Agent, or Firm* — Osha Bergman Watanabe & Burton LLP

(57) ABSTRACT

An apparatus includes: a hardware processor that executes, based on recognized information obtained by voice recognition, a process requiring an execution authority; and an authenticator that performs authentication to determine, using first confidential information that is preset, whether the execution authority has been given. Upon determining that the recognized information corresponds to the preset confidential information, the hardware processor provides a user with a predetermined notification regarding security of the preset confidential information.

10 Claims, 13 Drawing Sheets

(51) Int. Cl.
*G06F 3/16* (2006.01)
*G06F 21/60* (2013.01)
*H04N 1/00* (2006.01)
*H04N 1/44* (2006.01)

(58) Field of Classification Search
CPC .......... G06F 21/44; G06F 21/40; G06F 21/51; G06F 21/52; G06F 21/54; G06F 21/554; G06F 31/31; G06F 21/12; G06F 21/121; G06F 21/123; G06F 21/125; G06F 21/126; G06F 21/14; G06F 21/32; G06F 21/34; G06F 21/445; G06F 21/45; G06F 21/46; G06F 21/608; G06F 3/0412; G06F 3/0416; G06F 3/167; G10L 17/00; G10L 17/22; G10L 17/24; H04M 3/42059; H04M 3/382; H04M 3/42025; H04M 3/42034; H04M 3/42085; H04L 29/06782; H04L 63/02; H04L 63/08; H04L 63/083; H04L 63/0869; H04L 63/101; H04L 63/14; G06Q 20/4014; H04W 12/06; H04W 12/062; H04W 12/065; H04W 12/068; H04W 12/069; H04W 12/08; H04W 12/082; H04W 12/084; H04W 12/35; H04W 12/65; H04N 1/00403; H04N 1/4406
USPC ......... 704/275, E17.016, E15.043, 272, 273, 704/274; 379/142.01, 142.03, 142.05, 379/142.06, 142.17, 245, 246, 247, 93.02, 379/100.05, 111, 112.01, 112.07, 112.08, 379/133, 134, 142.04, 196, 201.01, 379/201.02, 201.07, 201.08; 713/182, 713/183, 184; 455/414.1, 415; 726/2, 3, 726/5, 6, 7
See application file for complete search history.

(56) References Cited

U.S. PATENT DOCUMENTS

| 2006/0212715 | A1 |   | 9/2006  | Terao |             |
|--------------|----|---|---------|-------|-------------|
| 2007/0061150 | A1 | * | 3/2007  | Sawano | .............. G07C 9/37 |
|              |    |   |         |        | 704/275 |
| 2009/0265770 | A1 | * | 10/2009 | Basson | .............. G06F 21/31 |
|              |    |   |         |        | 726/7 |
| 2014/0315181 | A1 |   | 10/2014 | Frempong et al. | |

FOREIGN PATENT DOCUMENTS

| CN | 107040547 A   |   | 8/2017 |              |
|----|---------------|---|--------|--------------|
| CN | 107600031 A   |   | 1/2018 |              |
| JP | 2007037099 A  | * | 2/2007 | .......... G03G 21/043 |
| JP | 2015080120 A  |   | 4/2015 |              |

OTHER PUBLICATIONS

Office Action issued in corresponding U.S. Appl. No. 16/401,544, dated Mar. 9, 2022 (17 pages).
Office Action issued in counterpart U.S. Appl. No. 16/401,544 dated Oct. 6, 2022 (26 pages).
Office Action issued in corresponding Chinese Application No. 201910408984.X; dated Nov. 28, 2022 (20 pages).
Office Action issued in corresponding Chinese Patent Application No. 201910408984.X, dated May 25, 2023, with translation (34 pages).

* cited by examiner

FIG.3

| USER ID | USER PASSWORD | E-MAIL ADDRESS |
|---|---|---|
| Yamada | 3p46Roo"2 | yamada.a@company.com |
| Ito | 1aAb" | ito.k@company.com |
| Takahashi | G3$0b | Takahashi2@company.com |
|  |  |  |

| USER ID | E-MAIL ADDRESS | DOCUMENT ID | DOCUMENT PASSWORD |
|---|---|---|---|
| Yamada | yamada.a@company.com | 1234 | abcde |
| Yamada | yamada.a@company.com | 1235 | 3p46Roo"2 |
| Ito | ito.k@company.com | 2222 | 1aAb" |
| Takahashi | Takahashi2@company.com | 3333 | G3$0b |
|  |  |  |  |

| BOX ID | BOX PASSWORD | E-MAIL ADDRESS |
|---|---|---|
| Yamada | abcde | yamada.a@company.com |
| Yamada | 3p46Roo"2 | yamada.a@company.com |
| Ito | 1aAb" | ito.k@company.com |
| Takahashi | G3$0b | Takahashi2@company.com |
|  |  |  |

|  |  | VOICE VOLUME | | |
|---|---|---|---|---|
|  |  | 0db - 9db | 10db - 29db | 30 dB OR MORE |
| NOISE VOLUME | 0db-19db | 2m | 5m | 10m |
|  | 20db-49db | 0m | 2m | 5m |
|  | 50 dB OR MORE | 0m | 0m | 2m |

T4

IMAGE PROCESSING APPARATUS, IMAGE FORMING APPARATUS, CONFIDENTIAL INFORMATION MANAGEMENT METHOD, AND RECORDING MEDIUM

CROSS-REFERENCE TO RELATED APPLICATION

This application is a divisional application of U.S. patent application Ser. No. 16/401,544, filed on May 2, 2019 and, claims priority to Japanese Patent Application No. 2018-094196, filed on May 16, 2018, both of which are incorporated herein by reference in its entirety.

BACKGROUND

Technical Field

The present invention relates to an image processing apparatus, an image forming apparatus, a confidential information management method, and a recording medium.

Description of the Related Art

Conventionally, operation instructions are input into an apparatus such as an image forming apparatus not only manually from an operation unit but also by voice. Usage of voice input for inputting confidential information such as a password may cause a security problem since the surrounding people may hear the confidential information.

There has been proposed some techniques for preventing leakage of a password etc. For example, if it is determined that a voice listed as voice input prohibition information is input during a voice input mode, in which a process is executed on the basis of voice input through a microphone, the input mode is shifted to an operation unit input mode, in which a user needs to perform input through a numeric keypad (see Japanese Patent Application Laid-Open Publication No. 2007-79852).

There has been proposed another technique as follows, regarding an image processing system for controlling an image processing apparatus by voice input from a portable terminal device. In displaying a screen for inputting a set value which has been set as confidential information, the set value is replaced with some other identification information and the replaced identification information is displayed together with the set value before replacement on the portable terminal device, so that a user inputs the replaced identification information by voice (see Japanese Patent Application Laid-Open Publication No. 2015-80120).

However, when confidential information is to be input after repeated operation instructions on the apparatus by voice input, the user may happen to read the confidential information aloud in the course of events so far, causing leakage of the confidential information.

SUMMARY

One or more embodiments of the present invention prevent leakage of confidential information by voice input.

According to one or more embodiments of the present invention, there is provided an image processing apparatus including:
a voice recognizer which recognizes information input by voice;
a hardware processor which gives an instruction to execute a process at least based on the information recognized by the voice recognizer; and
an authenticator which performs, in execution of the process, authentication to determine whether or not authority over the execution of the process has been given using confidential information set in advance,
wherein, if the information recognized by the voice recognizer corresponds to the confidential information, the hardware processor controls the confidential information to be invalidated.

According to one or more embodiments of the present invention, there is provided an image processing apparatus including: image forming apparatus including the image processing apparatus described above.

According to one or more embodiments of the present invention, there is provided an apparatus including:
a hardware processor that executes, based on recognized information obtained by voice recognition, a process requiring an execution authority; and
an authenticator that performs authentication to determine, using first confidential information that is preset, whether the execution authority has been given,
wherein, upon determining that the recognized information corresponds to the preset confidential information, the hardware processor provides a user with a predetermined notification regarding security of the preset confidential information.

According to one or more embodiments of the present invention, there is provided an image forming apparatus including the image processing apparatus described above.

According to one or more embodiments of the present invention, there is provided a confidential information management method including:
recognizing information input by voice;
providing an instruction to executing a process at least based on the information recognized in the recognizing;
performing, in execution of the process in the providing of the instruction, authentication to determine whether or not authority over the execution of the process has been given using confidential information set in advance; and
controlling the confidential information to be invalidated if the information recognized in the recognizing corresponds to the confidential information.

According to one or more embodiments of the present invention, there is provided a confidential information management method including:
obtaining recognized information by voice recognition;
executing, based on the recognized information, a process requiring an execution authority;
performing, using confidential information that is preset, authentication to determine whether the execution authority has been given; and
upon determining that the recognized information corresponds to the preset confidential information, providing a user with a predetermined notification regarding security of the preset confidential information.

According to one or more embodiments of the present invention, there is provided a non-transitory computer-readable recording medium having a program stored thereon for controlling a computer used in an image forming apparatus which includes a voice recognizer which recognizes information input by voice, a hardware processor which gives an instruction to execute a process at least based on the information recognized by the voice recognizer, and an authenticator which performs, in execution of the process, authentication to determine whether or not authority over the execution of the process has been given using confidential information set in advance, the computer the program causing the computer to function as:

a hardware processor which controls, if the information recognized by the voice recognizer corresponds to the confidential information, the confidential information to be invalidated.

According to one or more embodiments of the present invention, there is provided a non-transitory computer-readable recording medium storing a program for controlling a computer of an apparatus that includes a hardware processor that executes, based on recognized information obtained by voice recognition, a process requiring an execution authority, and an authenticator that performs, using confidential information that is preset, authentication to determine whether the execution authority has been given, the program causing the computer to function as:

a hardware processor that provides, upon determining that the recognized information corresponds to the preset confidential information, a user with a predetermined notification regarding security of the preset confidential information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a diagram showing data configured in a user management table according to one or more embodiments.

FIG. 4 is a diagram showing data configured in a security document management table according to one or more embodiments.

FIG. 5 is a diagram showing data configured in a box management table according to one or more embodiments.

FIG. 6 is a diagram showing data configured in a distance determination table according to one or more embodiments.

DETAILED DESCRIPTION

Hereinafter, embodiments of the present invention will be described with reference to the drawings. However, the scope of the invention is not limited to the disclosed embodiments.

[Configuration of Image Forming System]

Figure 1:
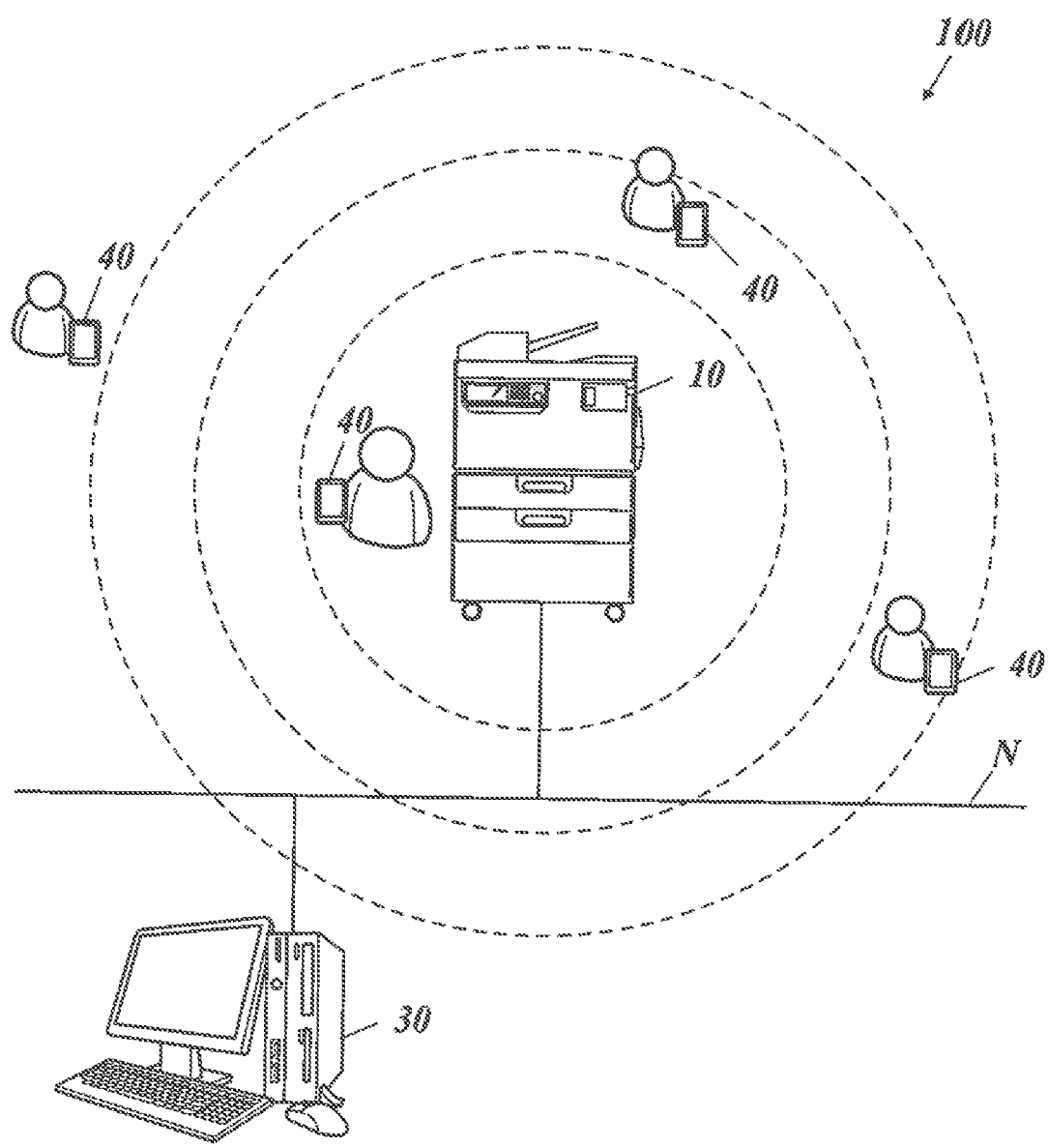
FIG. 1 is a system configuration diagram of an image forming system according to one or more embodiments.

FIG. 1 shows a system configuration of an image forming system 100.

As shown in FIG. 1, an image forming apparatus 10 and a personal computer(s) (PC(s)) 30 are connected through a communication network N in the image forming system 100 so that data can be as transmitted. The number of the PC 30 is not particularly limited.

Each user carries a portable terminal 40.

The image forming apparatus 10 is a Multi-Functional Peripheral (MFP) which functions as a printer, a photocopier, a scanner, and a facsimile.

Figure 2:
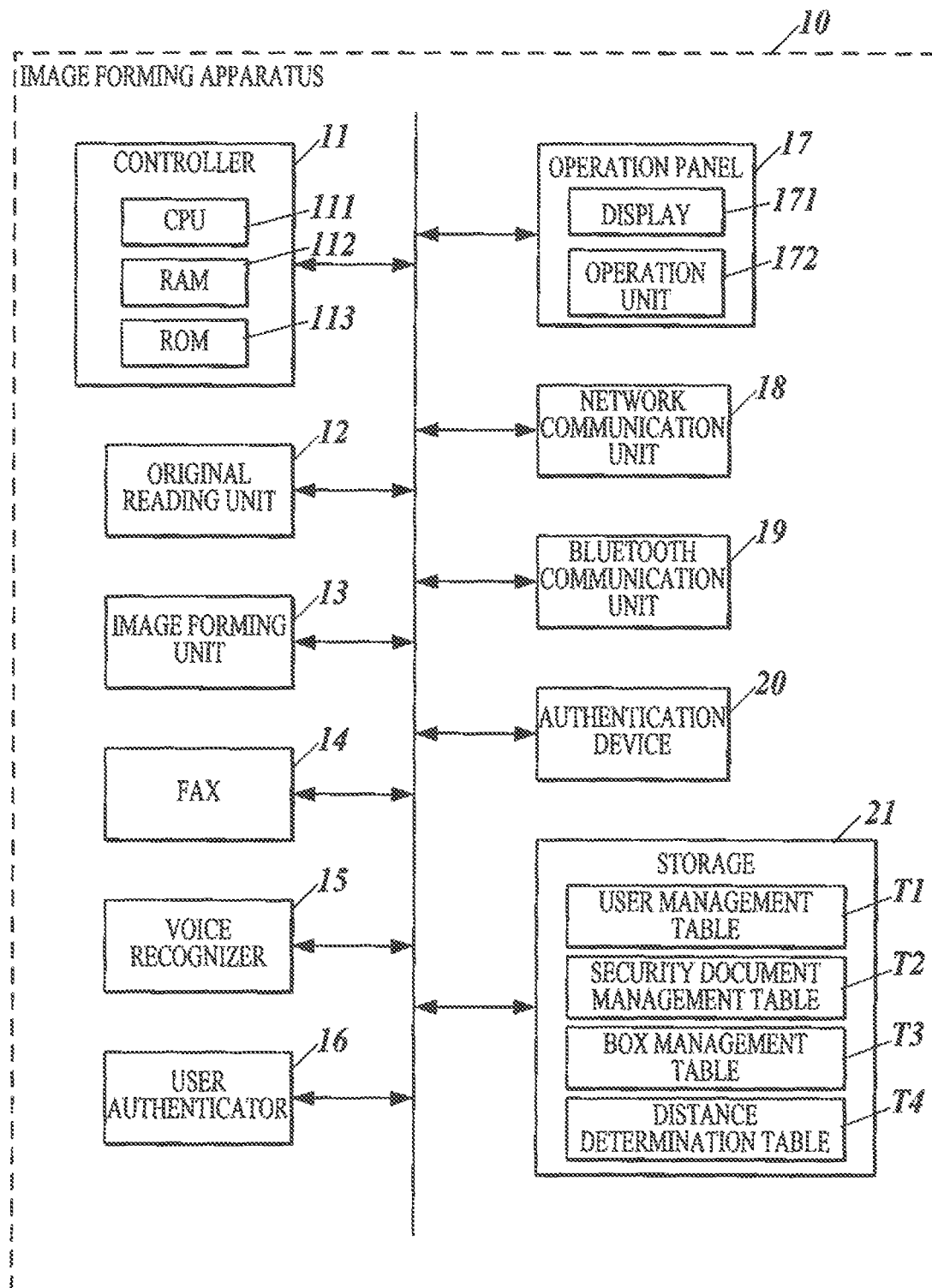
FIG. 2 is a block diagram showing a functional configuration of the image forming apparatus according to one or more embodiments.

FIG. 2 shows a functional configuration of the image forming apparatus 10.

As shown in FIG. 2, the image forming apparatus 10 includes a controller (hardware processor) 11, an original reading unit 12, an image forming unit 13, a FAX 14, a voice recognizer 15, a user authenticator 16, an operation panel 17, a network communication unit 18, a Bluetooth (registered trademark) communication unit 19, an authentication device 20, and a storage 21.

The controller 11 includes a central processing unit (CPU) 111, a random access memory (RAM) 112, a read only memory (ROM) 113, and the like. The CPU 111 reads out various processing programs stored in the ROM 113, deploys them in the RAM 112, and totally controls each unit of the image forming apparatus 10 to operate in accordance with the deployed programs.

The original reading unit 12 optically scans an original conveyed on a contact glass from an automatic document feeder (ADF: automatic original feeding device) or an original placed on the contact glass, forms an image on the light receiving surface of a CCD (Charge Coupled Device) sensor with light emitted by a light source and reflected by the original to be scanned, reads the original image, performs A/D conversion of the read image, and outputs the obtained image data to the controller 11.

The image forming unit 13 forms an image on a sheet based on the image data generated by the original reading unit 12, image data received by the network communication unit 18, image data for facsimile received by the FAX 14, and the like. For example, the image forming unit 13 performs electrophotographic image formation and includes a photosensitive drum, a charging unit that charges the photosensitive drum, an exposing unit that exposes and scans the surface of the photosensitive drum based on image data, a developing unit causing toner to adhere on the photosensitive drum, a transfer unit that transfers a toner image formed on the photosensitive drum, a fixing unit that fixes the toner image formed on the sheet, and the like.

The FAX 14 transmits and receives image data for facsimile.

The voice recognizer 15 has a microphone for inputting voice uttered by the user, interprets the uttered voice, and replaces the interpreted voice with character strings. That is, the voice recognizer 15 recognizes the information input by voice. The voice recognizer 15 is an input volume measurement unit that measures the volume of the voice (voice volume) input into the voice recognizer 15. The voice recognizer 15 is also a noise volume measurement unit that measures the volume of noise (noise volume) around the image forming apparatus 10. For example, besides the microphone for inputting the voice uttered by the user, inputting noise around the image forming apparatus 10. The voice recognizer 15 may distinguish the user's voice from the surrounding noise on the basis of their frequency, and measure the noise volume.

The user authenticator 16 performs authentication by checking information such as an ID and a password input by the user through the voice recognizer 15 or the operation unit 172 against reference data set in advance. That is, the user authenticator 16 is an authenticator that performs authentication using confidential information set in advance, so as to determine whether or not the user has authority to execute a process.

The operation panel 17 includes a display 171 which displays various kinds of information to the user, and an operation unit 172 for receiving the operation input by the user. The display 171 includes, for example, a color liquid crystal display. The operation unit 172 is provided on a screen of the display 171, for example, and includes a touch screen that receives touching operation for input of information, push button keys arranged around the screen of the display 171, and the like. The operation unit 172 is an input unit used for inputting information by a method other than voice input.

The network communication unit 18 is an interface for connecting the image forming apparatus 10 to the communication network N. The network communication unit 18 transmits and receives data to and from an external device such as the PC 30.

The Bluetooth communication unit 19 performs near field wireless communications of data by Bluetooth communications with an external device such as the portable terminal 40 or the like.

The authentication device 20 is a second authenticator that uses the second confidential information different from the confidential information used in the user authenticator 16 and determines whether or not authority over execution of a process has been given. In the authentication device 20, the second confidential information for each user has been recorded in advance. The authentication device 20 may be a card authentication device that reads user identification information stored in a magnetic card, IC card, or the like, or a biometric authentication device that reads biometric information on a user (data of a fingerprint, voiceprint, iris, face recognition, etc.). The authentication device 20 compares the user identification information read from the card or the biometric information read from the user with the second confidential information on the target user, and determines whether or not they match each other.

It is possible to log in to and use the image forming apparatus 10 using either PIN (Personal Identification Number) input authentication by PIN input (input of ID and password) or authentication by the authentication device 20 (hybrid authentication).

The storage 21 is a non-volatile memory configured by a hard disk drive (HDD), a solid state drive (SSD), or the like. For example, print data transmitted from the PC 30 is stored in the storage 21.

In the storage 21 is stored a user management table T1, a security document management table T2, a box management table T3, and a distance determination table T4.

The user management table T1 is a table for managing users of the image forming apparatus 10.

FIG. 3 shows data configured in the user management table T1. As shown in FIG. 3, the user management table T1 includes a user ID, a user password, and an e-mail address corresponding to each of the users.

The user ID is identification information on the user.

The user password is a password (confidential information) set for the user.

The e-mail address is an address of electronic mail as a notification destination of the user.

The security document management table T2 is a table for managing a security document. The security document is a document including a document ID and a document password set for print data transmitted from the PC 30 to the image forming apparatus 10 in order to ensure confidentiality of the print data. For printing the security document, it is necessary to specify the document ID and to input the document password.

FIG. 4 shows data configured in the security document management table T2. As shown in FIG. 4, the security document management table T2 includes a user ID, an e-mail address, a document ID, and a document password corresponding to each of the security documents.

The user ID is an ID of the user who created print data of the security document in the PC 30. The user ID, the document ID, and the document password are added to print data of the security document.

The e-mail address is an e-mail address corresponding to the user who created the print data of the security document.

The document ID is identification information added to the security document.

The document password is a password (confidential information) specified by the user when print data of the security document is created in the PC 30. The document password is a password for printing document data regarding security document printing.

The box management table T3 is a table for managing a box(es). The box is a folder made in the storage 21 of the image forming apparatus 10 and stores the image data generated by the original reading unit 12, image data received by the network communication unit 18, image data for facsimile received by the FAX 14, and the like.

FIG. 5 shows data configured in the box management table T3. As shown in FIG. 5, the box management table T3 includes a box ID, a box password, and an e-mail address corresponding to each of the boxes.

The box ID is identification information added to the box (folder). In the box, there are stored the image data generated by scanning an original, the document data received through the communication network N, and the like.

The box password is a password for using the box (folder) and has been set for the box.

The e-mail address is an e-mail address of the user corresponding to the box.

The user management table T1, the security document management table T2, and the box management table T3 store notification destination of the user(s). The authenticator 16 determines whether or not authority over the execution of the process has been given to the user.

The distance determination table T4 is a table for determining a predetermined distance used in detecting whether or not there is a person other than the operator within a predetermined distance from the image forming apparatus 10 (hereinafter referred to as a predetermined distance). The predetermined distance is determined depending on the voice volume of the operator using the image forming apparatus 10 and the noise volume around the image forming apparatus 10.

FIG. 6 shows data configured in the distance determination table T4. The larger the voice volume is, the more likely the surrounding people are to hear the confidential information and accordingly the longer the predetermined distance is set. Meanwhile, the larger the noise volume is, the less likely the surrounding people are to hear the confidential information and accordingly the shorter the predetermined distance is set.

The CPU 111 instructs each unit of the image forming apparatus 10 to execute a process at least based on the information recognized by the voice recognizer 15.

The CPU 111 causes the user authenticator 16 to perform authentication in execution of the processes, using the confidential information set in advance, so as to determine whether or not authority over execution of the process has been given to the user.

If the information recognized by the voice recognizer 15 corresponds to the confidential information, the CPU 111 controls the confidential information to be invalidated.

The case where the information recognized by the voice recognizer 15 (voice-recognized information) corresponds to the confidential information includes not only the case where the voice-recognized information matches the confidential information, but also the case where they are determined to be similar to each other on the basis of a predetermined condition. That is, even if the password input by voice does not completely match the password which has been set for execution of process, the set password may be invalidated if it is determined that these passwords are similar to each other as a result of similarity determination of the passwords. For example, it is determined that the passwords are similar if 90% of the characters composing the password set for execution of process include the characters composing the password input by voice (for example, if the passwords are composed of ten characters and nine of them are included in the password input by voice).

In the example of each process described later with reference to the flowchart, the confidential information is invalidated if the voice-recognized information matches the confidential information (password).

If the information recognized by the voice recognizer 15 corresponds to the confidential information, the CPU 111 may invalidate the confidential information after execution of the process corresponding to authentication.

The process corresponding to authentication is a process to be a target of authentication using a password. For example, with regard to a security document for which a document password has been set, the process corresponding to authentication is printing of the security document. Further, with regard to a personal box for which a box password has been set, the process corresponding to authentication is operation of the personal box. Further, with regard to a login process for which a user password has been set, the process corresponding to authentication is a process from login to logout.

Even when the confidential information has been invalidated, the CPU 111 may permit execution of the process(es) until the image forming apparatus 10 is restarted, until the image forming apparatus 10 is reset, or until a predetermined time elapses.

The CPU 111 generates new confidential information used for authentication by the user authenticator 16.

If the information recognized by the voice recognizer 15 corresponds to the confidential information, the CPU 111 replaces the confidential information to be invalidated with the generated new confidential information.

The CPU 111 prompts the user to input the generated new confidential information through the operation unit 172.

If the information input through the operation unit 172 corresponds to the new confidential information, the CPU 111 permits execution of the process corresponding to authentication.

The CPU 111 notifies the generated new confidential information to the notification destination (e-mail address) of the user stored in the storage 21.

If the information recognized by the voice recognizer 15 corresponds to the confidential information, the CPU 111 prompts the user to input the new confidential information through the operation unit 172. That is, the CPU 111 requests the user to change the confidential information.

The CPU 111 detects whether or not there is a person other than the operator within the predetermined distance from the image forming apparatus 10.

If it is detected that there is a person other than the operator within the predetermined distance, the CPU 111 controls the confidential information to be invalidated. The CPU 111 does not control the confidential information to be invalidated if it is detected that there is no person other than the operator within the predetermined distance.

The CPU 111 changes the predetermined distance depending on the voice volume measured by the voice recognizer 15. Further, the CPU 111 changes the predetermined distance depending on the noise volume measured by the voice recognizer 15.

If the information recognized by the voice recognizer 15 corresponds to the confidential information, the CPU 111 invalidates the confidential information but does not invalidate the second confidential information used in the authentication device 20.

The PC 30 is a computer device operated by each user. For example, the user creates document data to be printed on the PC 30 and transmits the document data to the image forming apparatus 10. A user ID, a document ID, and a document password are added to the document data upon instructions by the PC 30 to print the security document.

The portable terminal 40 is a smartphone or the like carried by each user. The portable terminal 40 exerts a Bluetooth communication function. If the portable terminal 40 receives an inquiry about whether or not connection from the image forming apparatus 10 can be made by Bluetooth communication, for example, the portable terminal 40 transmits information on the possibility of connection to the image forming apparatus 10 as well as the user ID of the user using the portable terminal 40.

[Operation of Image Forming Apparatus]

Next, the operation of the image forming apparatus 10 will be described. Each process is executed by a software process in cooperation with the CPU 111 of the controller 11 and the program stored in the ROM 113.

<Basic Process of Image Forming Apparatus>

Figure 7:
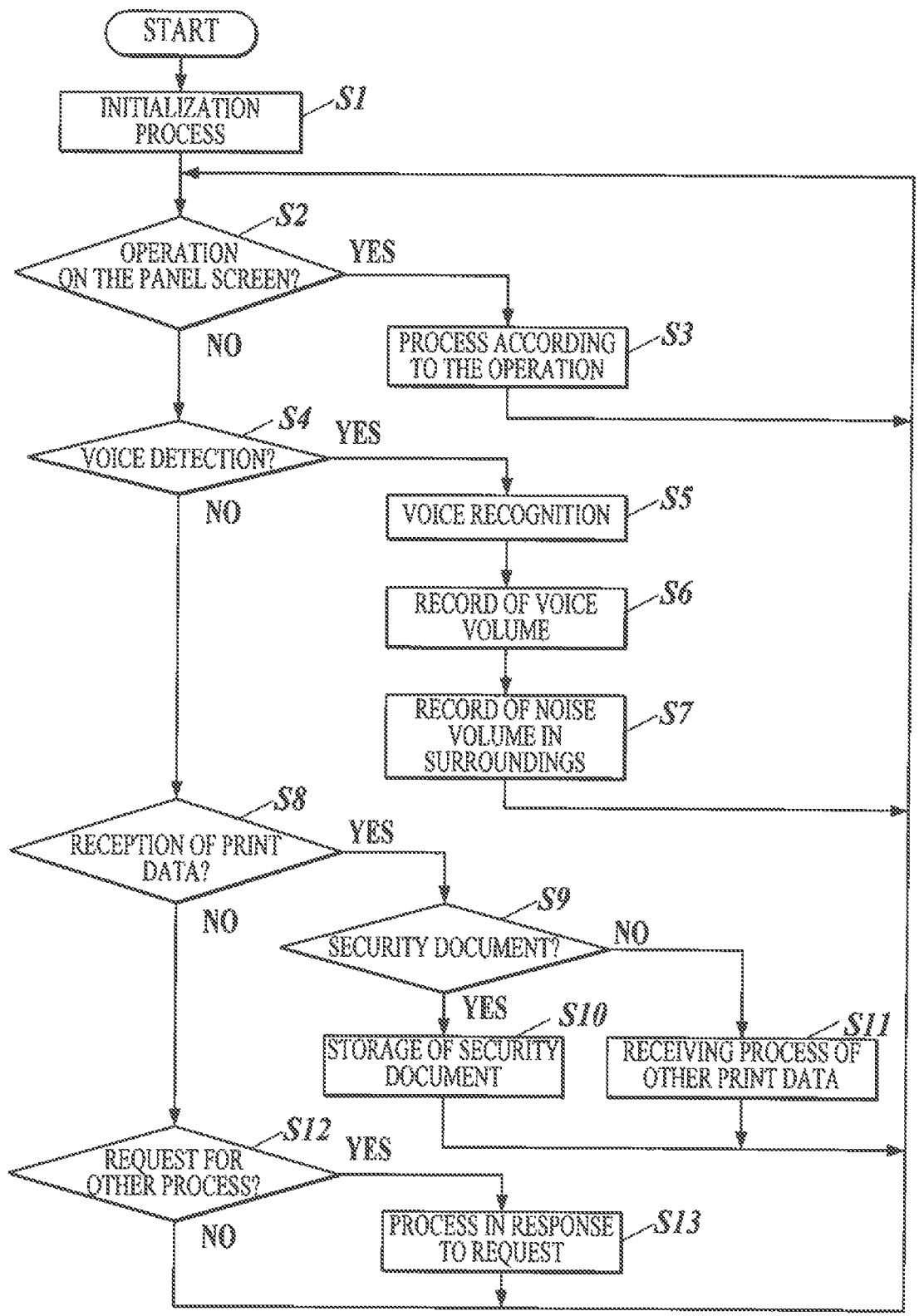
FIG. 7 is a flowchart showing a basic process according to one or more embodiments.

FIG. 7 is a flowchart showing a basic process executed by the image forming apparatus 10.

First, the CPU 111 performs an initialization process of the image forming apparatus 10 (step S1). After that, the CPU 111 repeatedly executes the processes after step S2 of FIG. 7 until the power of the image forming apparatus 10 is turned off.

The CPU 111 of the image forming apparatus 10 determines whether or not operation has been performed on the panel screen of the operation panel 17 (step S2). The operation on the panel screen includes an instruction on the security document printing, operation of the document stored in the personal box, and the like. The operation methods (instruction methods) of the panel screen include input operation through the operation unit 172 and voice input operation with the voice recognizer 15.

If the operation on the panel screen has been performed (step S2; YES), the CPU 111 performs a process according to the operation (step S3).

In step S2, if the operation on the panel screen has not been performed (step S2; NO), the CPU 111 determines whether or not the voice recognizer 15 has detected a voice (step S4).

If a voice has been detected by the voice recognizer 15 (step S4; YES), the CPU 111 causes the voice recognizer 15 to convert the information input by voice into a character string(s) and to perform voice recognition (step S5).

Next, the CPU 111 causes the voice recognizer 15 to measure the volume of the voice uttered by the user, and records the obtained voice volume in the storage 21 (step S6).

Next, the CPU 111 causes the voice recognizer 15 to measure the volume of the noise around the image forming apparatus 10, and records the obtained noise volume in the storage 21 (step S7).

In step S4, if voice is not detected by the voice recognizer 15 (step S4; NO), the CPU 111 determines whether or not the print data has been received from the PC 30 through the network communication unit 18 (step S8).

If the print data has been received (step S8; YES), the CPU 111 determines whether or not print data of a security document has been received (step S9).

If print data of a security document has been received (step S9; YES), the CPU 111 stores the security document in the storage 21 (step S10). Specifically, the CPU 111 stores the security document in the security document box of the storage 21 and stores the user ID, the document ID, and the document password added to the security document associated with each other in the security document management table T2. Further, the CPU 111 obtains an e-mail address corresponding to the user ID added to the security document from the user management table T1, and stores the acquired e-mail address in the security document management table T2 as a record corresponding to the security document.

If print data of a security document has not been received in step S9 (step S9; NO), the CPU 111 performs a receiving process of other print data (step S11). Description of the receiving process of other print data is omitted, as it is not directly related to one or more embodiments of the present invention.

If print data has not been received in step S8 (step S8; NO), the CPU 111 determines whether or not there is a request for another process (step S12).

If there is a request for another process (step S12; YES), the CPU 111 performs a process according to the request (step S13).

If there is no request for another process in step S12 (step S12; NO) or after the process of step S3, step S7, step S10, step S11, or step S13, the CPU 111 returns to the process of step S2.

<Security Document Printing Process>

Figure 8:
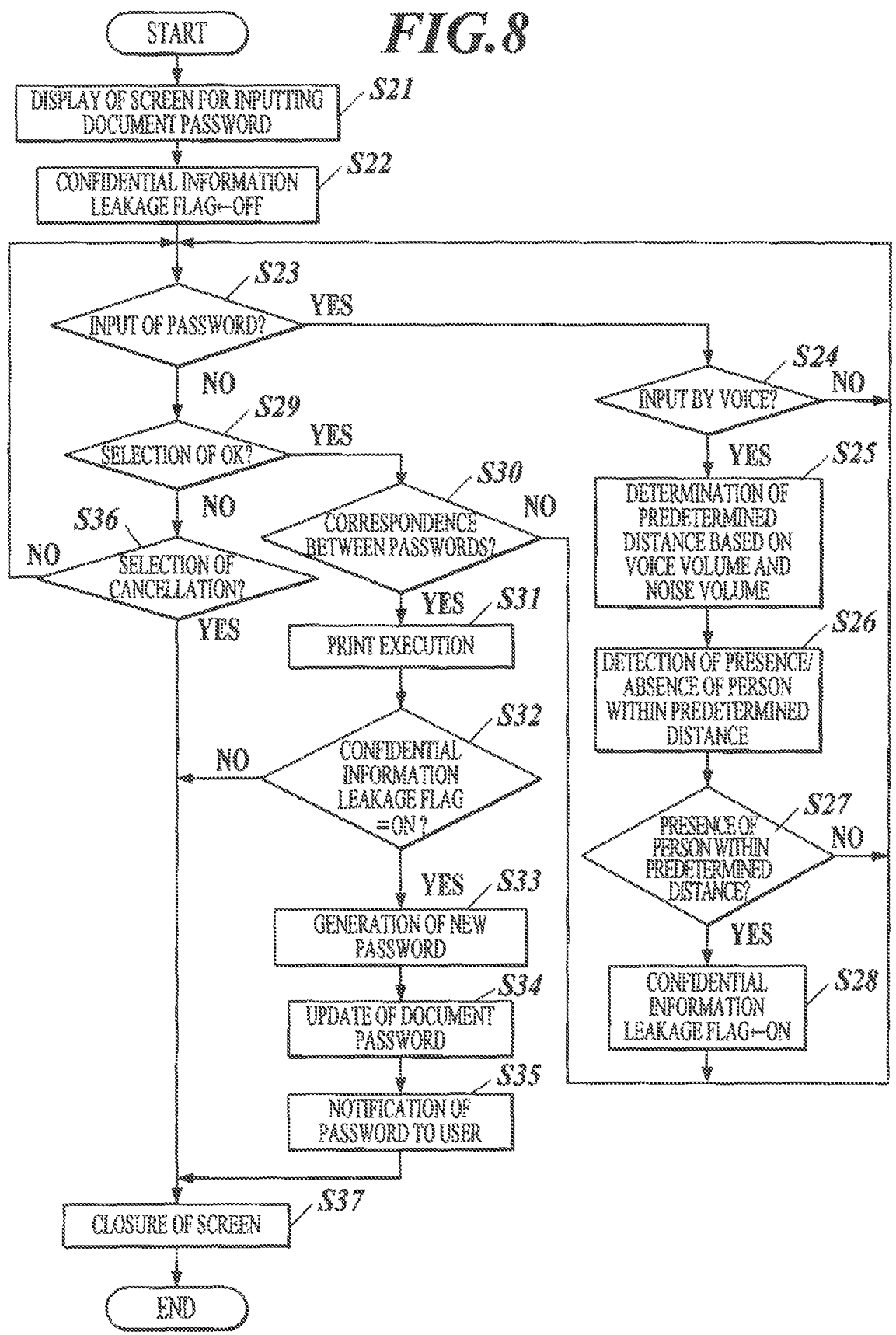
FIG. 8 is a flowchart showing a security document printing process according to one or more embodiments.

FIG. 8 is a flowchart showing a security document printing process.

The security document printing process is performed in printing the security document in the image forming apparatus 10. The security document printing process corresponds to an example of the process of step S3 in the basic process.

As a premise of the security document printing, print data of a security document with a user ID, a document ID, and a document password has been recorded in the image forming apparatus 10 in advance by the user through operation of the PC 30

The user inputs an operation instruction on the panel screen displayed on the display 171 of the image forming apparatus 10.

Figure 9:
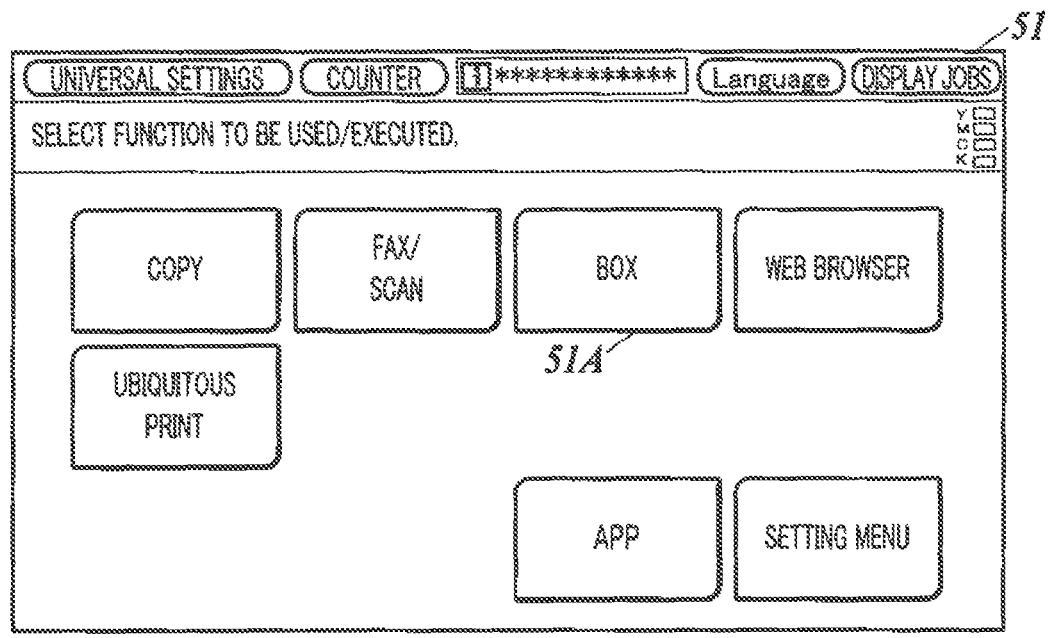
FIG. 9 is an example of a menu screen according to one or more embodiments.

In a case where the display 171 displays an exemplary menu screen 51 of FIG. 9, if the user utters "box", the CPU 111 gives an instruction to "select a box" based on the information recognized by the voice recognizer 15. That is, in the menu screen 51, the operation of selecting the box 51A can be performed by voice.

Figure 10:
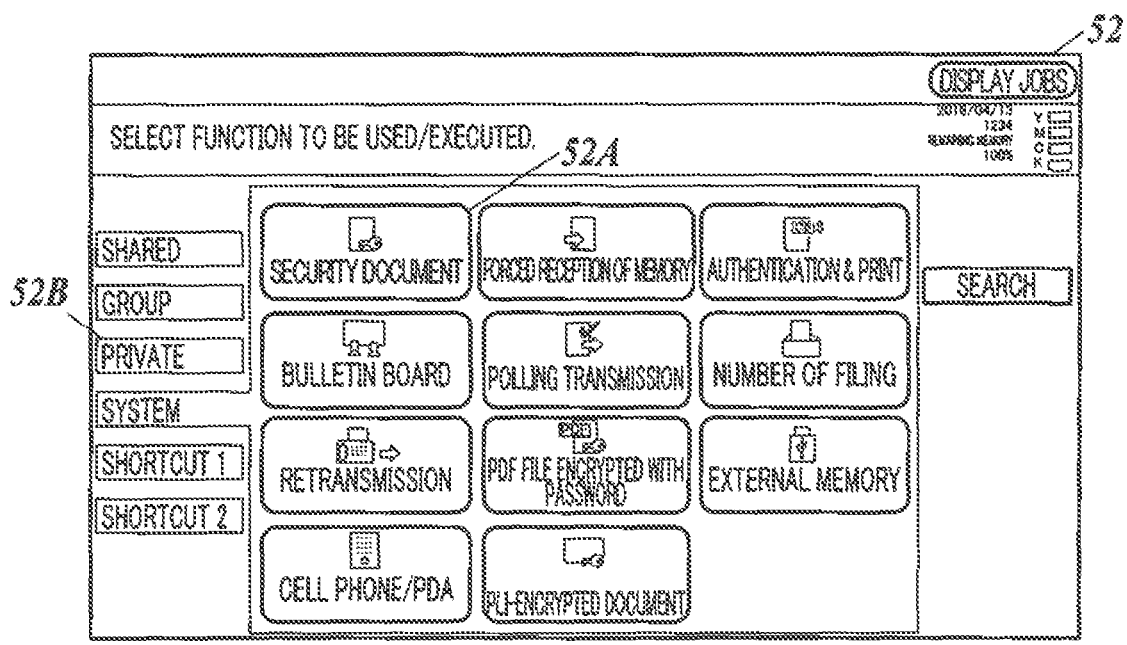
FIG. 10 is an example of a system box selection screen according to one or more embodiments.

As a result, the display 171 displays the system box selection screen 52 as shown in FIG. 10. If the user subsequently utters "security document," the CPU 111 gives an instruction to "select a security document" based on the information recognized by the voice recognizer 15. That is, in the system box selection screen 52, the operation of selecting the security document 52A can be performed by voice.

Figure 11:
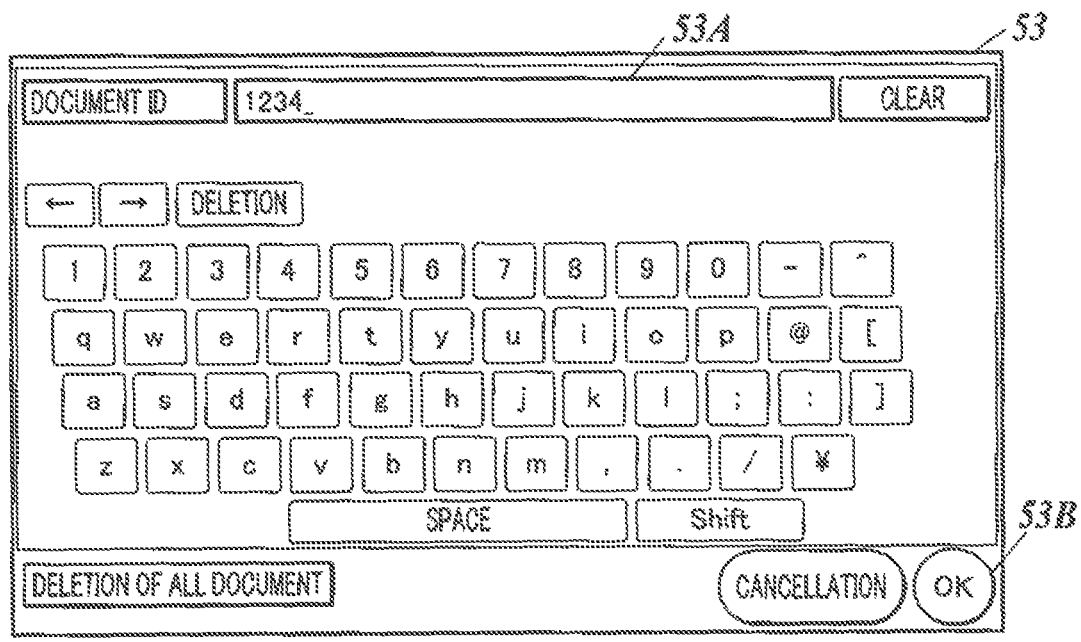
FIG. 11 is an example of a document ID input screen according to one or more embodiments.

As a result, the display 171 displays the document ID input screen 53 as shown in FIG. 11. Here, if the user utters the document ID (such as "1234") and subsequently utters "OK," the CPU 111 gives an instruction to "specify the document ID" based on the information recognized by the voice recognizer 15. That is, in the document ID input screen 53, operation of inputting the document ID in the document ID input area 53A and operation of pressing the OK key 53B can be performed by voice. The user may press the OK key 53B instead of uttering "OK."

After the document ID has been input, the security document printing process of FIG. 8 is performed.

the CPU 111 causes the display 171 to display a document password input screen for inputting a document password corresponding to the document ID uttered and recognized by the voice recognizer 15 voice (step S21).

Figure 12:
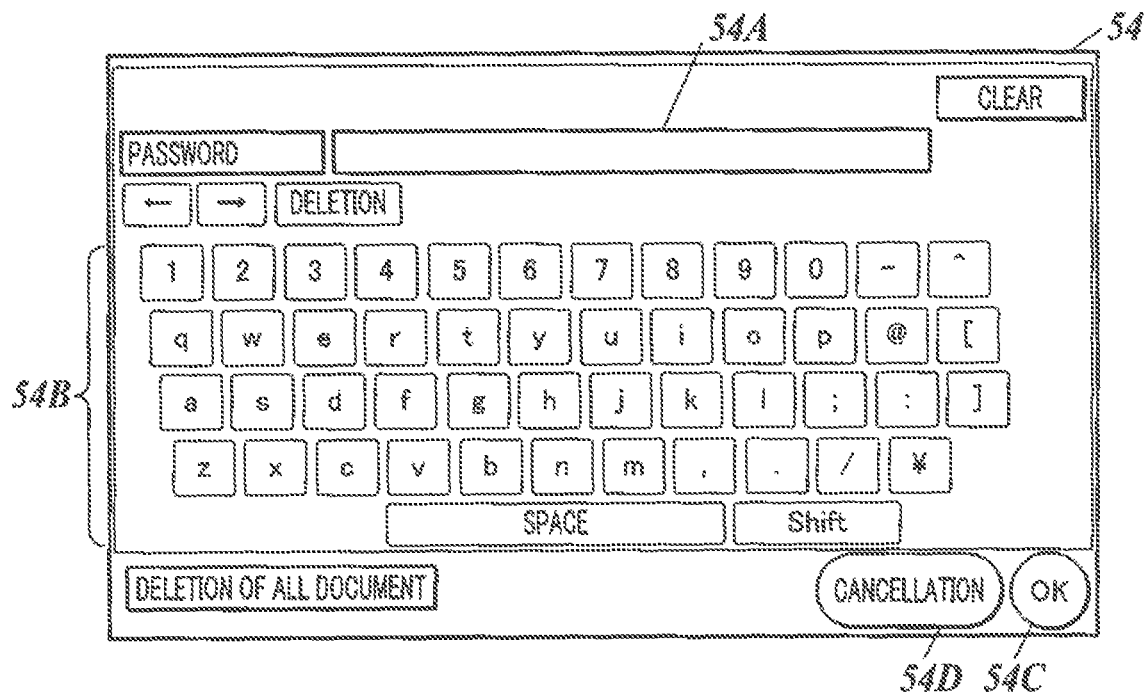
FIG. 12 is an example of a document password input screen according to one or more embodiments.

FIG. 12 is an example of the document password input screen 54. The document password input screen 54 includes a document password input area 54A, an input key 54B, an OK key 54C, a cancel key 54D, and the like.

Further, the CPU 111 turns off the confidential information leakage flag stored in the RAM 112 (step S22).

Next, the CPU 111 determines whether or not a password has been input (step S23). Specifically, the CPU 111 determines whether or not the input key 54B of the operation unit 172 has been pressed and whether or not the voice recognizer 15 has recognized a voice while the document password input screen 54 is displayed.

If the password has been input by pressing the input key 54B or by voice (step S23; YES), the CPU 111 displays the character string(s) in turned letter(s) such as asterisk(s) in the document password input area 54A.

Next, the CPU 111 determines whether or not the input password is information input by voice to the voice recognizer 15 (step S24).

If the input password is information input by voice (step S24; YES), the CPU 111 determines a predetermined distance for detecting the presence or absence of a person other than the operator based on the voice volume and the noise volume recorded in the storage 21 (Step S25). Specifically, the CPU 111 determines a predetermined distance based on the distance determination table T4 shown in FIG. 6.

Next, the CPU 111 detects the presence or absence of a person within a predetermined distance from the image forming apparatus 10 other than the operator (step S26). Specifically, the CPU 111 causes the Bluetooth communication unit 19 to transmit an inquiry with an intensity reaching within a predetermined distance, about whether or not connection can be made. Each mobile terminal 40 existing within a predetermined distance returns a response to which a user ID corresponding to the user who uses the mobile terminal 40 is added. If any of the mobile terminals 40 returns the response to which a user ID corresponding to a user other than the operator of the image forming apparatus 10 is added, the CPU 111 determines that there is a person other than the operator within the predetermined distance. The user ID of the operator of the image forming apparatus 10 is a user ID corresponding to the specified document ID in the security document management table T2.

If there is a person other than the operator within the predetermined distance (step S27; YES), the CPU 111 turns on the confidential information leakage flag stored in the RAM 112 (step S28).

If input of a password by voice or by pressing of the input key 54B is not detected in step S23 (step S23; NO), the CPU 111 determines whether or not OK has been selected (step S29). Specifically, the CPU 111 determines whether or not the OK key 54C of the operation unit 172 has been pressed, and whether or not the voice recognizer 15 has recognized a voice "OK."

If OK has been selected (step S29; YES), the CPU 111 determines whether or not the password input by that time matches the document password corresponding to the specified document ID according to the security document management table T2 (step S30).

If the input password matches the document password (step S30; YES), the CPU 111 causes the image former 13 to execute printing on the basis of the print data of the corresponding security document (step S31).

Next, the CPU 111 determines whether or not the confidential information leakage flag stored in the RAM 112 is ON (step S32). If the confidential information leakage flag is ON (step S32; YES), that is, if the user (operator) has input the password by voice and there is a person other than the operator within a distance determined in consideration of the volume of voice and noise, the CPU 111 invalidates the password of the security document of the user and generates a new password (step S33). It is possible to prevent accidental uttering of the password by intentionally generating a password that is difficult to utter, such as a tongue twister.

Next, the CPU 111 updates the document password to the new password in the security document management table T2 of the storage 21 (step S34). Specifically, the CPU 111 replaces the document password corresponding to the specified document ID in the security document management table T2 with the new password. After the replacement, it is necessary to input the new document password for printing this security document.

Next, the CPU 111 performs notification of the new password to the e-mail address of the user corresponding to the security document through the network communication unit 18 (step S35). Specifically, the CPU 111 obtains an e-mail address corresponding to the security document from the security document management table T2, and transmits an e-mail including the new password to the e-mail address.

If OK has not been selected in step S29 (step S29; NO), the CPU 111 determines whether or not cancellation has been selected (step S36). Specifically, the CPU 111 determines whether or not the cancel key 54D of the operation unit 172 is pressed, and whether or not a voice "cancel" has been recognized by the voice recognizer 15.

If the password is not the information input by voice in step S24 (step S24; NO), if there is no person other than the operator within the predetermined distance in step S27 (step S27; NO), after step S28, if the input password in step S30 does not match the document password (step S30; NO), or if cancellation has not been selected in step S36 (step S36; NO), the CPU 111 returns to the process of step S23. That is, the CPU 111 determines whether or not the input key 54B has been pressed or the password has been input by voice.

If the confidential information leakage flag is not ON in step S32 (step S32; NO), if cancellation has not been selected in step S36 (step S36; YES), or after step S35, the CPU 111 closes the screen on the display 171 (step S37).

Thus, the security document printing process is completed.

<Personal Box Operation Process>

Figure 13:
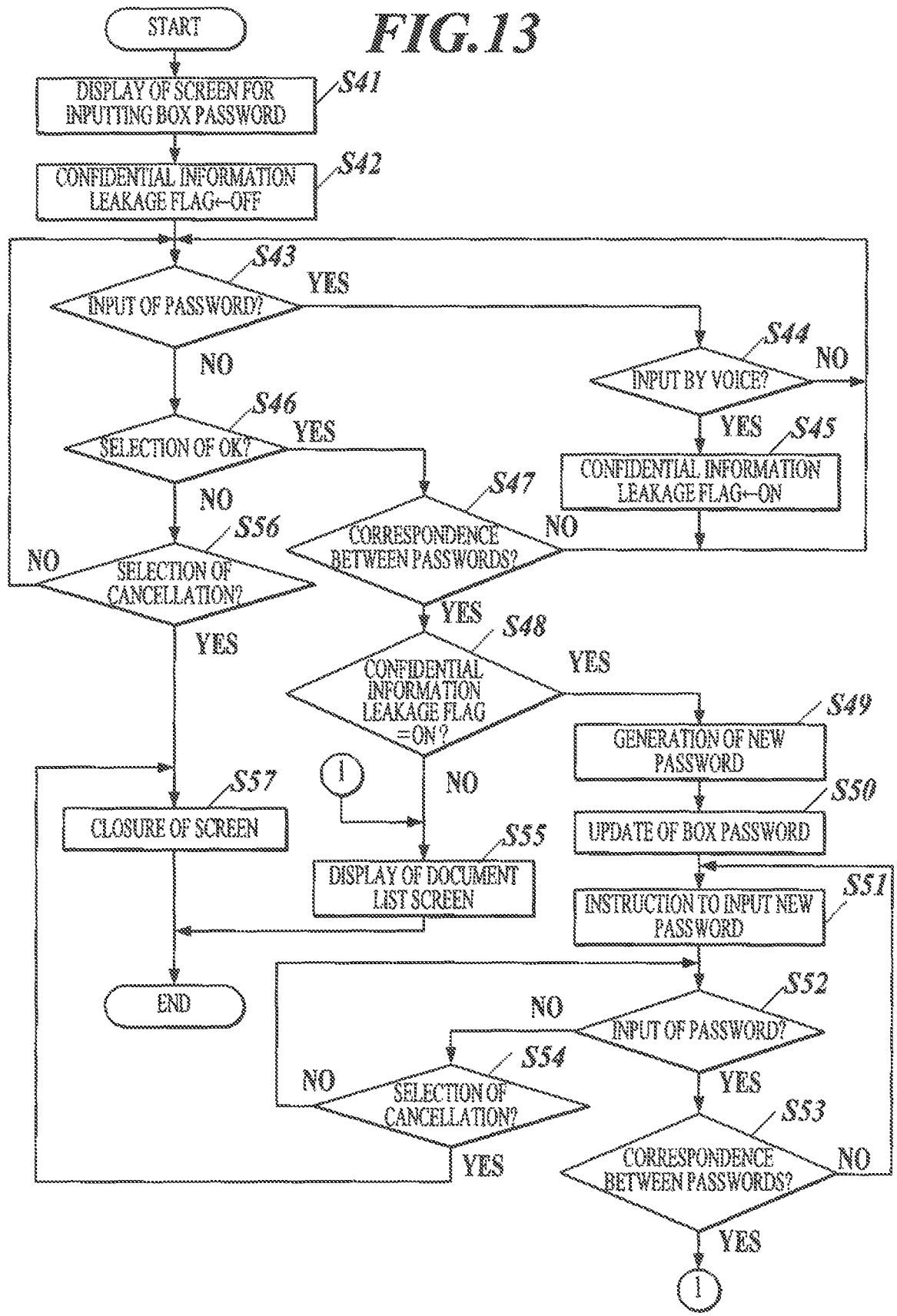
FIG. 13 is a flowchart showing a personal box operation process according to one or more embodiments.

FIG. 13 is a flowchart showing a personal box operation process.

The personal box operation process is performed when the personal box is operated in the image forming apparatus 10. The personal box operation process corresponds to one of the processes of step S3 of the basic process.

As a premise of the personal box operation, a personal box corresponding to the user is set in advance.

The user inputs an operation instruction to the panel screen displayed by the display 171 of the image forming apparatus 10.

If the user utters "box" while the menu screen 51 shown in FIG. 9 is displayed, the display 171 displays the system box selection screen 52 shown in FIG. 10. If the user utters "individual", the CPU 111 performs an instruction "to select a personal tab" based on the information recognized by the voice recognizer 15. That is, an operation of selecting the personal tab 52B can be performed by voice while the system box selection screen 52 is displayed.

Figure 14:
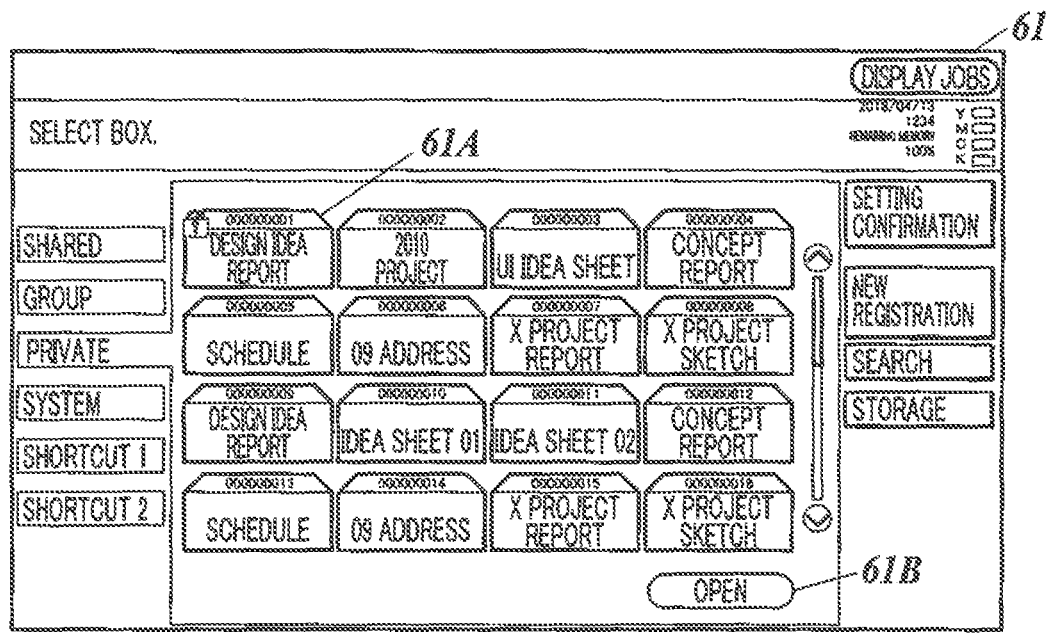
FIG. 14 is an example of a personal box screen according to one or more embodiments.

As a result, the display 171 displays a personal box screen 61 as shown in FIG. 14. If the user utters "000000001" or the like to select a personal box to be operated, and then utters "open", the CPU 111 performs instruction to "select a personal box" based on the information recognized by the voice recognizer 15". That is, while the personal box screen 61 is displayed, the operation of selecting the personal box 61A and the operation of pressing the open key 61B can be performed by voice. Instead of uttering "open", the user may press the open key 61B.

If the personal box is selected, the personal box operation process of FIG. 13 is performed.

The CPU 111 causes the display 171 to display a box password input screen for inputting a box password corresponding to the personal box recognized by the voice recognizer 15 (step S41).

Figure 15:
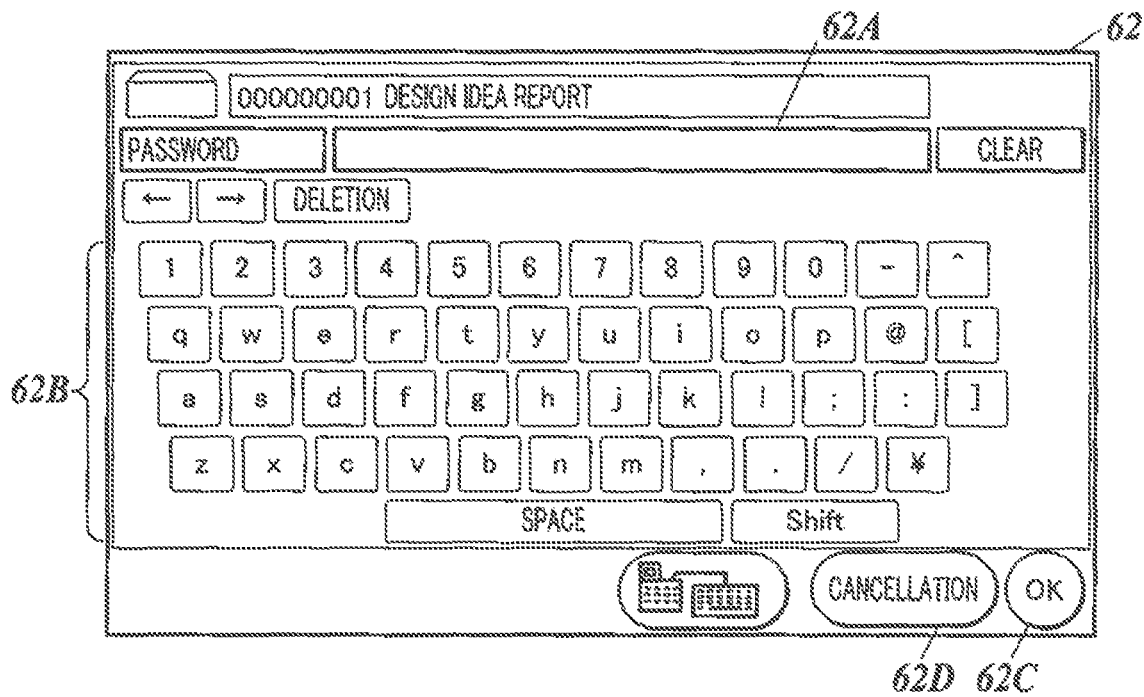
FIG. 15 is an example of a box password input screen according to one or more embodiments.

An example of the box password input screen 62 is shown in FIG. 15. The box password input screen 62 includes a box password input area 62A, an input key 62B, an OK key 62C, a cancel key 62D, and the like.

Further, the CPU 111 turns off the confidential information leakage flag stored in the RAM 112 (step S42).

Next, the CPU 111 determines whether or not a password has been input (step S43). Specifically, while the box password input screen 62 is displayed, the CPU 111 determines whether or not the input key 62B of the operation unit 172 has been pressed and whether or not voice has been recognized by voice recognizer 15.

If the password has been input by pressing the input key 62B or by voice (step S43; YES), the CPU 111 causes the character string to be displayed in turned letter(s) such as asterisk(s) in the box password input area 62A.

Next, the CPU 111 determines whether or not the input password is information input into the voice recognizer 15 by voice (step S44).

If the password is information input by voice (step S44; YES), the CPU 111 turns on the confidential information leakage flag stored in the RAM 112 (step S45).

If pressing of the input key 62B or input of a password by voice is not detected in step S43 (step S43; NO), the CPU 111 determines whether or not OK has been selected (step S46). Specifically, the CPU 111 determines whether or not the OK key 62C of the operation unit 172 has been pressed, and whether or not the voice "OK" has been recognized by the voice recognizer 15.

If OK has been selected (step S46; YES), the CPU 111 determines whether or not the password input up to that time matches the box password corresponding to the selected personal box (box ID) according to the box management table T3 (step S47).

If the input password matches the box password (step S47; YES), the CPU 111 determines whether or not the confidential information leakage flag stored in the RAM 112 is ON (step S48).

If the confidential information leakage flag is ON (step S48; YES), the CPU 111 invalidates the box password of the selected personal box and generates a new password (step S49). The generated password may be a word which is difficult to utter, such as a tongue twister.

Next, the CPU 111 updates the box password to the new password in the box management table T3 of the storage 21 (step S50). Specifically, the CPU 111 replaces the box password corresponding to the selected personal box (box ID) in the box management table T3 with the new password. After the replacement, it is necessary to input the new box password for performing operation of this personal box.

Next, the CPU 111 causes the display 171 to display the new password and further an instruction to prompt the user to input a new password through the operation unit 172 (step S51). The new password is input using a method other than voice input, that is, through a touch screen, keys arranged around the screen of the display 171, or the like.

Figure 16:
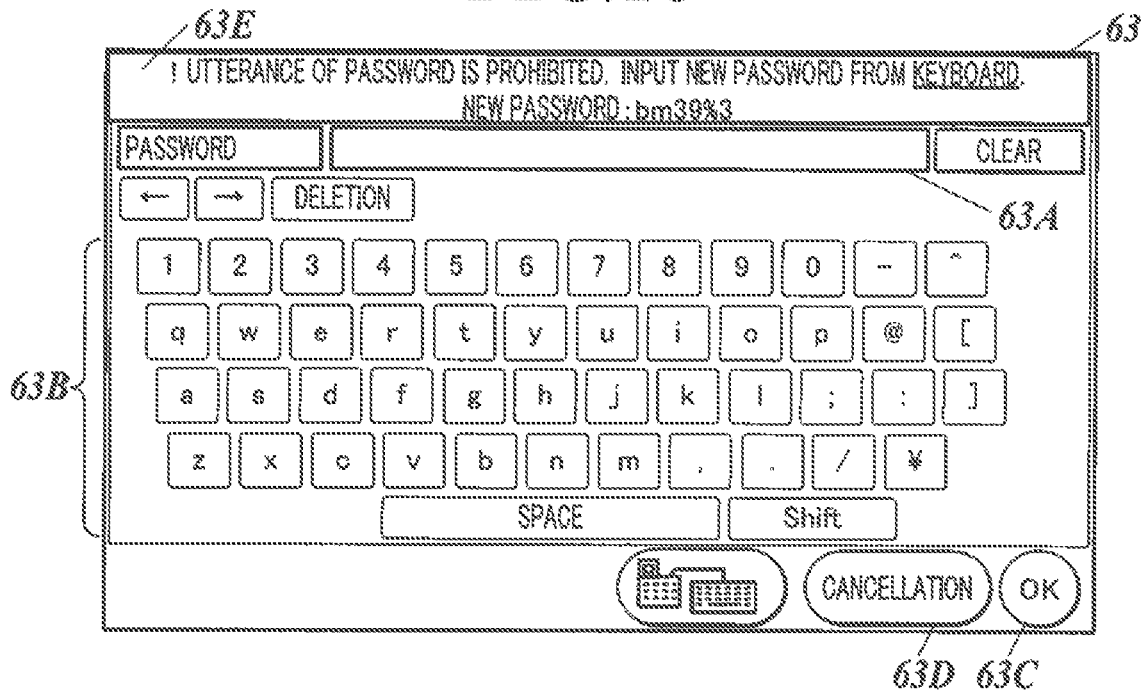
FIG. 16 is an example of a new password input screen according to one or more embodiments.

FIG. 16 shows an example of the new password input screen 63 displayed by the display 171. The new password input screen 63 includes a box password input area 63A, an input key 63B, an OK key 63C, a cancel key 63D, a message display area 63E, and the like. The message display area 63E displays a message prompting the user to input the new box password from the input key 63B.

Here, the CPU 111 determines whether or not a password has been input through the operation unit 172 (step S52). Specifically, the CPU 111 determines whether or not the input key 63B of the operation unit 172 has been pressed while the new password input screen 63 is displayed.

If a password has been input through the operation unit 172 (step S52; YES), the CPU 111 determines whether or not the input password matches the newly updated box password (step S53).

If the input password does not match the new box password (step S53; NO), the CPU 111 returns to the process of step S51.

If the password has not been input through the operation unit 172 in step S52 (step S52; NO), the CPU 111 determines whether or not cancellation has been selected (step S54). Specifically, the CPU 111 determines whether or not the cancel key 63D of the operation unit 172 has been pressed, and whether or not the voice recognizer 15 has recognized a voice "cancel".

If cancellation has not been selected (step S54; NO), the CPU 111 returns to the process of step S52.

If the confidential information leakage flag is not ON at step S48 (step S48; NO) or if the input password matches the new box password at step S53 (step S53; YES), the CPU 111 causes the display 171 to display a document list screen (step S55).

Figure 17:
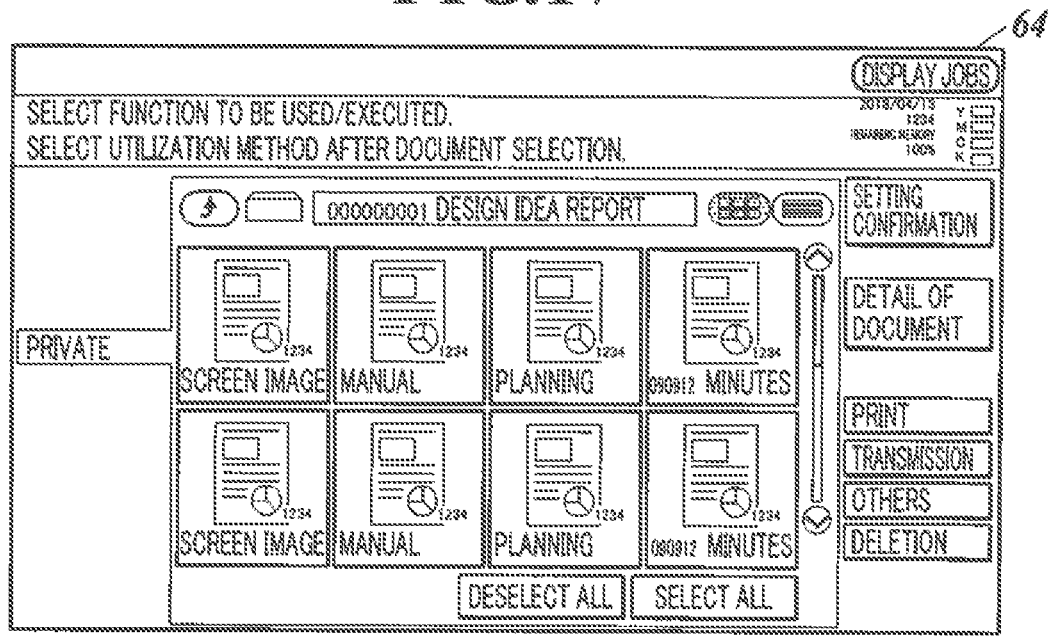
FIG. 17 is an example of the document list screen according to one or more embodiments.

FIG. 17 shows an example of the document list screen 64 displayed by the display 171. The document list screen 64 shows a list of documents stored in the selected personal box. It is possible to perform a process such as printing and transmission for each document stored in the selected personal box.

If it is determined in step S46 that OK has not been selected (step S46; NO), the CPU 111 determines whether or not cancellation has been selected (step S56). Specifically, the CPU 111 determines whether or not the cancel key 62D of the operation unit 172 has been pressed, and whether or not the voice recognizer 15 has recognized a voice "cancel."

If the password is not the information input by voice in step S44 (step S44; NO), after step S45, if the input password does not match the box password in step S47 (step S47; NO), or if it is determined in step S56 that cancellation has not been not selected (step S56; NO), the CPU 111 returns to the process of step S43. That is, the CPU 111 determines whether or not the password has been input by pressing of the input key 62B or by voice.

If it is determined in step S54 that cancellation has been selected (step S54; YES) or if it is determined in step S56 that cancellation has been selected (step S56; YES), the CPU 111 closes the screen on the display 171 (step S57).

The personal box operation process ends after step S55 or step S57.

In step 45, it may be determined whether or not the confidential information leakage flag is turned on depending on the voice volume and the noise volume of the surroundings as in the security document printing process.

<Hybrid Authentication Process>

Figure 18:
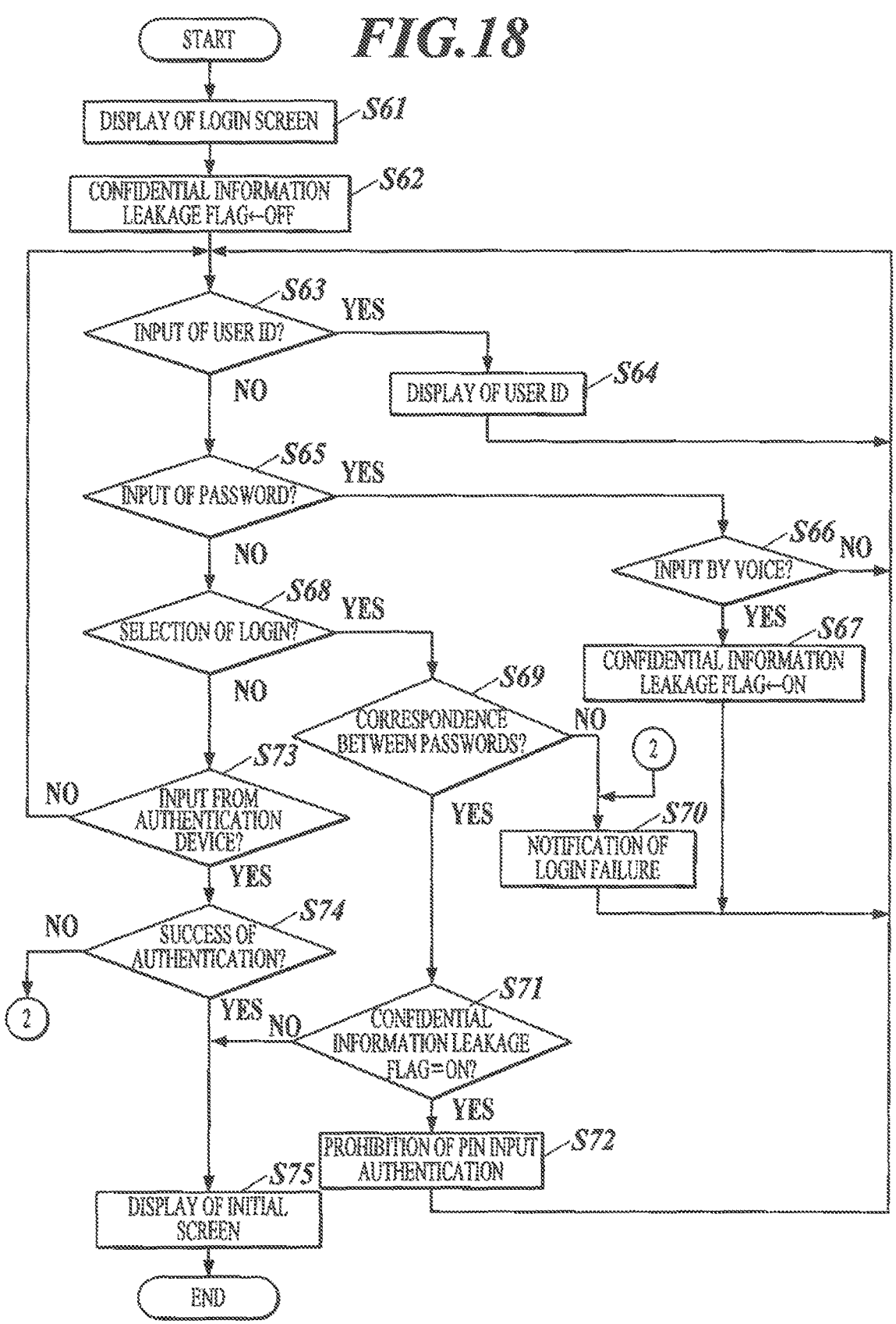
FIG. 18 is a flowchart showing a hybrid authentication process according to one or more embodiments.

FIG. 18 is a flowchart showing the hybrid authentication process.

The hybrid authentication process is a process for permitting the user to use the image forming apparatus 10 if it is determined that authority over execution of a process has been given to the user, as a result of either PIN input authentication or authentication by the authentication device 20. The hybrid authentication process corresponds to one of the processes of step S3 of the basic process.

First, the CPU 111 causes the display 171 to display a login screen (step S61).

Figure 19:
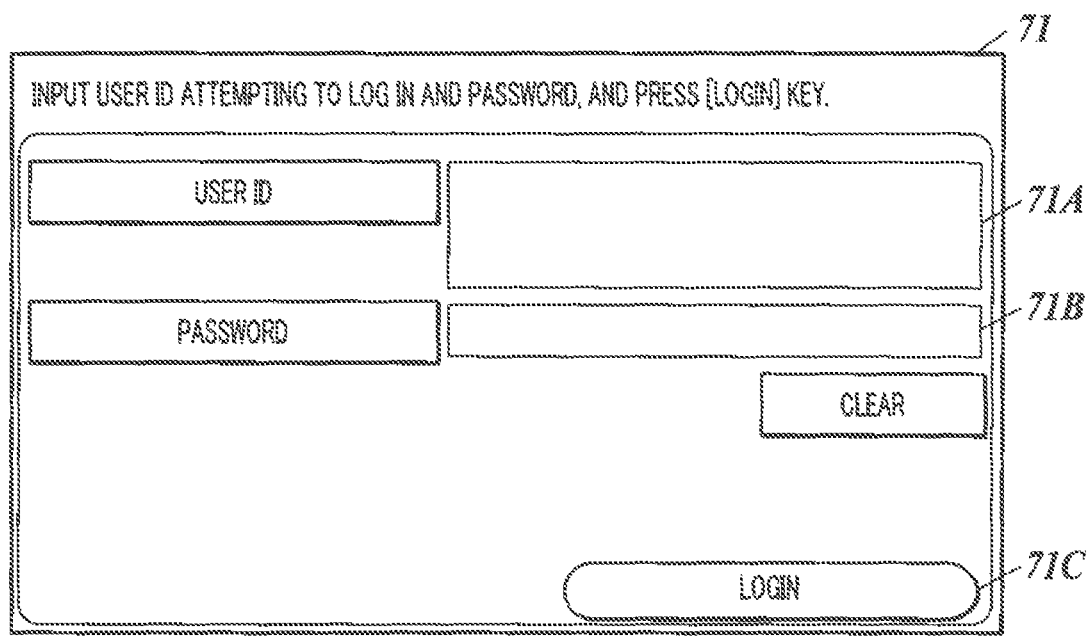
FIG. 19 is an example of a login screen according to one or more embodiments.

FIG. 19 is an example of the login screen 71 displayed by the display 171. The login screen 71 includes a user ID input area 71A, a password input area 71B, a login key 71C, and the like.

The CPU 111 turns off the confidential information leakage flag stored in the RAM 112 (step S62).

Next, the CPU 111 determines whether or not a user ID has been input (step S63). Specifically, the CPU 111 determines whether or not a user ID has been input in the user ID input area 71A of the login screen 71 through the operation unit 172. Further, while the login screen 71 is displayed, the CPU 111 determines whether or not the information input by voice into the voice recognizer 15 is recognized as a user ID.

For example, the CPU 111 recognizes the voice following the recognition of a voice of "user ID" as the input of the user ID by voice. In addition, if a voice is detected after the user has selected (touched) the user ID input area 71A, the CPU 111 recognizes the voice as an input of the user ID by voice.

If the user ID has been input (step S63; YES), the CPU 111 causes the display 171 to display the input user ID (step S64).

If it is determined in step S63 that a user ID has not been input (step S63; NO), the CPU 111 determines whether or not a password has been input (step S65). Specifically, the CPU 111 determines whether or not a password has been input in the password input area 71B of the login screen 71 through the operation unit 172. Further, while the login screen 71 is displayed, the CPU 111 determines whether or not the information input by voice into the voice recognizer 15 has been recognized as a password. For example, the CPU 111 recognizes the voice after recognition of the voice "password" as a voice input of the password. Further, if a voice is detected after the user has selected (touched) the password input area 71B, the CPU 111 recognizes the voice as input of the password by voice.

If a password has been input (step S65; YES), the CPU 111 causes the display 171 to display the password in the password input area 71B of the login screen 71 in turned letter(s) such as asterisk(s).

Next, the CPU 111 determines whether or not the input password is the information input by voice into the voice recognizer 15 (step S66).

If the password is the information input by voice (step S66; YES), the CPU 111 turns on the confidential information leakage flag stored in the RAM 112 (step S67).

If it is determined in step S65 that the password has not been input (step S65; NO), the CPU 111 determines whether or not login has been selected (step S68). Specifically, the CPU 111 determines whether or not the login key 71C in the login screen 71 of the operation unit 172 has been pressed. Further, the CPU 111 determines whether or not the voice recognizer 15 has recognized the voice "login" while the login screen 71 is displayed and the user ID and the password are already input.

If login has been selected (step S68; YES), the CPU 111 determines whether or not the password input up to that time matches the user password corresponding to the user ID input in step S63 according to the user management table T1 (step S69).

If the input password does not match the user password (step S69; NO), the CPU 111 causes the display 171 to display a notification of login attempt failure (step S70).

If the input password matches the user password in step S69 (step S69; YES), the CPU 111 determines whether or not the confidential information leakage flag stored in the RAM 112 is ON (step S71).

If the confidential information leakage flag is ON (step S71; YES), the CPU 111 prohibits the PIN input authentication (step S72). For example, the CPU 111 causes the login screen 71 on the display 171 to be grayed out in order to indicate that the input of the user ID and the password is not accepted through the operation unit 172 or by the voice recognition. Thus, prohibition of PIN input authentication, such as no acceptance of an user ID or an input password, also corresponds to password invalidation.

If it is determined in step S68 that login has not been selected (step S68; NO), the CPU 111 determines whether or not there has been an input from the authentication device 20 (step S73). Specifically, the CPU 111 determines whether or not the authentication device 20 has read the information from the card and/or the biological information is from the user.

If there has been no input from the authentication device 20 (step S73; NO), after step S64, if it is determined in step S66 that the password is not the information input by voice (step S66; NO), after step S67, after step S70, or after step S72, the CPU 111 returns to the process of step S63.

If it is determined in step S73 that there has been an input from the authentication device 20 (step S73; YES), the CPU 111 determines whether or not the authentication in the authentication device 20 is successful (step S74). Specifically, the CPU 111 obtains, from the authentication device 20, a determination result indicating whether or not the information read from the card or the biological information read from the user matches the second confidential information.

If the authentication in the authentication device 20 is not successful (step S74; NO), the CPU 111 returns to the process of step S70.

If the authentication in the authentication device 20 is successful in step S74 (step S74; YES), or if the confidential information leakage flag is not ON in step S71 (step S71; NO), the CPU 111 causes the display 171 to display the initial screen (step S75). That is, the CPU 111 permits use of the image forming apparatus 10 by the user if the authentication is successful by either the PIN input authentication or the authentication by the authentication device 20.

Thus, the hybrid authentication process is completed.

<Password Update Request Process>

Figure 20:
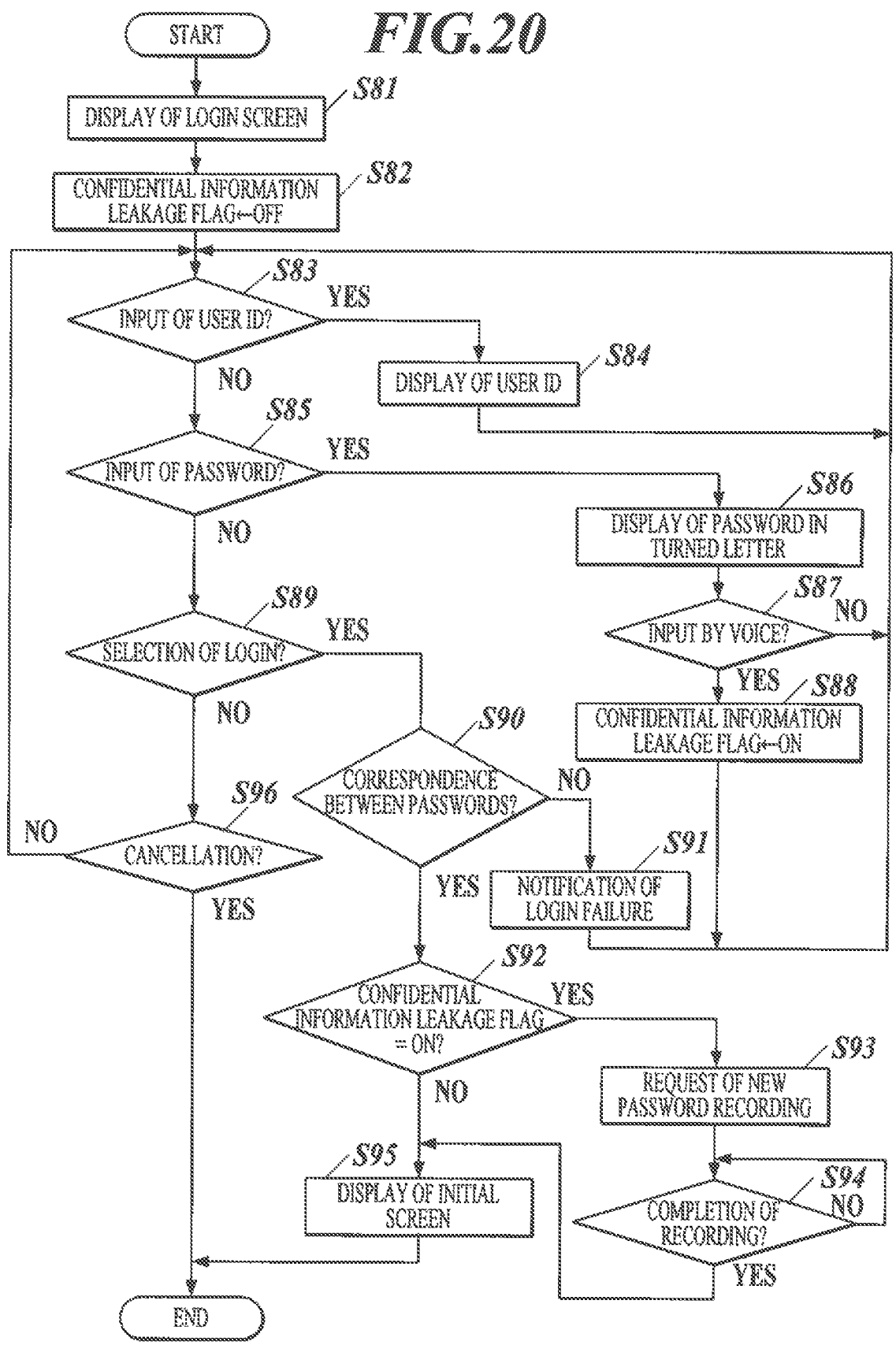
FIG. 20 is a flowchart showing a password update request process according to one or more embodiments.

FIG. 20 is a flowchart showing a password update request process.

The password update request process is a process of requesting to update the password if the user has uttered the password. The password update request process corresponds to one of the processes of step S3 in the basic process.

The processes of steps S81 to S85 are similar to those of steps S61 to S65 of the hybrid authentication process (see FIG. 18), and thus the description thereof is omitted.

If it is determined in step S85 that a password has been input (step S85; YES), the CPU 111 causes the display 171 to display the password in turned letter(s) such as asterisk(s) in the password input area of the login screen (step S86).

Next, the CPU 111 determines whether or not the input password is the information input by voice into the voice recognizer 15 (step S87).

If the password is the information input by voice (step S87; YES), the CPU 111 turns on the confidential information leakage flag stored in the RAM 112 (step S88).

If it is determined in step S85 that the password has not been input (step S85; NO), the CPU 111 determines whether or not login has been selected (step S89). Specifically, the CPU 111 determines whether or not the login key in the login screen 71 of the operation unit 172 has been pressed. Further, the CPU 111 determines whether or not the voice recognizer 15 has recognized the voice "login" while the login screen is displayed and the user ID and the password are already input.

If login has been selected (step S89; YES), the CPU 111 determines whether or not the password input up to that time matches the user password corresponding to the user ID input in step S83 according to the user management table T1 (step S90).

If the input password does not match the user password (step S90; NO), the CPU 111 causes the display 171 to display a notification of login attempt failure (step S91).

If the input password matches the user password in step S90 (step S90; YES), the CPU 111 determines whether or not the confidential information leakage flag stored in the RAM 112 is ON (step S92).

If the confidential information leakage flag is ON (step S92; YES), the CPU 111 requests to record a new password (step S93). At this time, the CPU 111 causes the display 171 to display a dialog box for prompting the user to input a new password through the operation unit 172.

Next, the CPU 111 determines whether or not the requested recording of the password has been completed (step S94). Specifically, the CPU 111 determines whether or not a new password has been input through the operation unit 172 and recorded in the user management table T1 of the storage 21.

If the requested recording of the password has not been completed (step S94; NO), the process returns to step S94.

If it is determined in step S94 that the requested recording of the password has been completed (step S94; YES) or if the confidential information leakage flag is not ON at step S92 (step S92; NO), the CPU 111 causes the display 171 to display the initial screen (step S95).

If it is determined in step S89 that login has not been selected (step S89; NO), the CPU 111 determines whether or not cancellation has been selected (step S96). Specifically, the CPU 111 determines whether or not the cancel key in the login screen of the operation unit 172 has been pressed. In addition, the CPU 111 determines whether or not the voice recognizer 15 has recognized a voice "cancel" while the login screen is displayed.

If cancellation has not been selected (step S96; NO), after step S84, if it is determined in step S87 that the password is not the information input by voice (step S87; NO), after step S88, or after step S91, the CPU 111 returns to the process of step S83.

If it is determined in step S96 that cancellation has been selected (step S96; YES), or after step S95, the password update request process is ended.

After the determination that the requested recording of the password has been completed in step S94, it is necessary for this user to enter a new user password in order to newly log in.

As described above, according to one or more embodiments, if the information recognized by the voice recognizer 15 corresponds to confidential information, the confidential information is controlled to be invalidated (changed to a new password, prohibition of permitting execution of processes using the password, etc.). As a result, it is possible to prevent leakage of confidential information due to voice input. This prevents an abuse by others even if the user carelessly makes the confidential information aloud.

In addition, since the confidential information is invalidated after the process for the authentication if the information recognized by the voice recognizer 15 corresponds to confidential information, at least the process for authentication can be performed.

Further, if the information recognized by the voice recognizer 15 corresponds to confidential information, new confidential information used for authentication by the user authenticator 16 is automatically generated to reduce the time and effort of changing the confidential information.

Further, if new confidential information is generated, the user is made to input new confidential information through the operation unit 172 on the spot. As a result, in the user's memory are easy to remain the fact that the confidential information should not be voiced out, the fact that the confidential information has been changed, and the value etc. of the new confidential information.

Further, since the newly generated confidential information is notified to the user notification destination, it is possible to save the trouble of the user for recording the value of new confidential information.

Further, if the information recognized by the voice recognizer 15 corresponds to the confidential information, the user is prompted to change of the confidential information by a method other than the voice input. In this way, new confidential information can be input immediately and safely.

In one or more embodiments, the input from the touch screen (including the software key on the screen) or the keys arranged around the screen of the display 171 has been described as an input through the operation unit 172, but an external hardware keyboard may be used to input information by key operation.

Further, if there is no person other than the operator around the image forming apparatus 10 and there is substantially no bad effect due to the utterance of the confidential information, it is not necessary to invalidate the confidential information. Therefore, in one or more embodiments, it is possible to omit unnecessary control.

Further, in a case where the PIN input authentication and authentication by the authentication device 20 are used in combination, even if confidential information is voiced out in the PIN input authentication, it is possible to use the image forming apparatus 10 by the authentication using the authentication device 20.

The descriptions above are examples of an image processing apparatus, an image forming apparatus, a confidential information management method, and a recording medium according to one or more embodiments of the present invention, but the present invention is not limited thereto. The detailed configuration and the detailed operation of each part constituting the apparatus can be appropriately modified as long as they do not depart from the scope of the present invention.

For example, in the security document printing process of FIG. 8 and the personal box operation process of FIG. 13, a new password is automatically generated and the old password is changed to the new password. The user may be further caused to input a new password (to change the password) in the security document print process and/or the personal box operation process, as in the password update request process of FIG. 20.

In one or more embodiments, even in a case where "cancel" instruction has been issued while each password input screen is displayed, the password may be invalidated if the password has already been input by voice and the confidential information leakage flag is ON, as well as the case where the "OK" instruction has been issued.

Further, in one or more embodiments, it is determined whether or not there is a person other than the operator within a predetermined distance from the image forming apparatus 10 by performing Bluetooth communication between the image forming apparatus 10 and each portable terminal 40. However, the present invention is not limited to this method, and various types of human sensors may be used to detect whether or not there is a person other than the operator within a predetermined distance from the image forming apparatus 10. Further, multiple detection methods may be used in combination to detect whether or not there is a person other than the operator within a predetermined distance from the image forming apparatus 10.

The GPS function installed in the portable terminal 40 owned by the user may be used. In this case, the image forming apparatus 10 accesses a server that manages GPS information on each portable terminal 40, acquires position information on each user, and obtains the distance from the image forming apparatus 10 and each portable terminal 40 on the basis of the position information on the image forming apparatus 10. Then, it is determined whether or not there is a person other than the operator within the predetermined distance from the image forming apparatus 10 by a comparison between the determined distance and the predetermined distance.

In one or more embodiments, confidential information (each password) is stored in the storage 21 (in the user management table T1, security document management table T2, box management table T3 or the like). However, confidential information may be stored in an external server or the like. Alternatively, the input information may be transmitted to and authenticated by the external server, so that the authentication result is obtained by the user authenticator 16.

Further, if the information recognized by the voice recognizer 15 corresponds to the confidential information, a voice such as "password is incorrect" may be output. As a result, the user may get an impression that the word carelessly uttered by the user is incorrect.

[Modification Example]

Next, a modification example of one or more embodiments will be described.

Since the image forming system of the modification example has the same configuration as the image forming system 100 of one or more embodiments, the same reference numerals as those in the above-described embodiments are used to omit the description of the common parts.

The configuration in which the password is invalidated in one or more embodiments is changed to one in which the user is notified of a warning while keeping the password valid in the modification example.

If the information recognized by the voice recognizer 15 corresponds to the confidential information, the CPU 111 of the image forming apparatus 10 performs control in which the user is notified of a predetermined warning regarding security of the confidential information.

The predetermined warning includes, for example, a prompt to change the password.

The CPU 111 causes the display 171 of the image forming apparatus 10 to display the predetermined warning. For example, the CPU 111 causes the display 171 to display a message for prompting the user to change the password.

Further, the CPU 111 may transmit an email including the predetermined warning to the user. For example, the CPU 111 obtains the notification destination (email address) of the user from the user management table T1 stored in the storage 21 and transmits an e-mail including a prompt to change a password to the e-mail address.

In this case, since the user may change the password late or may not change the password, it is desirable that the CPU 111 notifies the user again if the password is not changed during the predetermined period. For example, if the user inputs the password which is to be changed according to the warning, the warning is displayed again or is transmitted again to the user by e-mail.

As in one or more embodiments, in the modification example, the CPU 111 may detect whether or not there is a person other than the operator within a predetermined distance from the image forming apparatus 10, and may notify the user of a warning to if presence of a person other than the operator is detected within the predetermined distance.

Alternatively, if absence of a person other than the operator is detected within the predetermined distance, the CPU 111 may not notify the user of the warning.

The CPU 111 changes the predetermined distance depending on the voice volume measured by the voice recognizer 15. Further, the CPU 111 changes the predetermined distance depending on the noise volume measured by the voice recognizer 15.

According to the modification example, if the information recognized by the voice recognizer corresponds to the confidential information, control is performed to notify the user of a predetermined warning regarding the security of the confidential information. As a result, it is possible to prevent leakage.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An apparatus comprising:
a hardware processor that executes, based on recognized information obtained by voice recognition, a process requiring an execution authority; and
an authenticator that performs authentication to determine, using input confidential information that is preset, whether the execution authority has been given,
wherein, upon determining that the recognized information corresponds to the preset input confidential information, the hardware processor provides a user with a predetermined notification regarding security of the preset input confidential information,
wherein the predetermined notification includes a prompt to change the preset input confidential information to new confidential information to be used for performing the authentication, and
wherein the hardware processor:
detects whether there is a person other than an operator within a predetermined distance from the apparatus, and
upon determining that a person other than the operator is detected within the predetermined distance, invalidates the preset input confidential information.

2. The apparatus according to claim 1, further comprising:
a display,
wherein the hardware processor causes the display to display the predetermined notification.

3. The apparatus according to claim 1, wherein the hardware processor transmits an email including the predetermined notification to the user.

4. The apparatus according to claim 1,
wherein the hardware processor changes the predetermined distance depending on measured volume of voice inputted into a voice recognizer.

5. The apparatus according to claim 1,
wherein the hardware processor changes the predetermined distance depending on measured volume of noise around the apparatus.

6. The apparatus according to claim 1, wherein the preset input confidential information is a password used in printing document data regarding security document printing.

7. The apparatus according to claim 1, wherein the preset input confidential information is a password used in using a folder that stores image data generated by scanning an original, or document data received through communication network.

8. An image forming apparatus comprising the apparatus according to claim 1.

9. A confidential information management method comprising:

obtaining recognized information by voice recognition;

executing, based on the recognized information, a process requiring an execution authority;

performing, using input confidential information that is preset, authentication to determine whether the execution authority has been given; and upon determining that the recognized information corresponds to the preset input confidential information, providing a user with a predetermined notification regarding security of the preset input confidential information, wherein the predetermined notification includes a prompt to change the preset input confidential information to new confidential information to be used for performing the authentication, and wherein the method further comprises:

detecting whether there is a person other than an operator within a predetermined distance from the apparatus, and upon determining that a person other than the operator is detected within the predetermined distance, invalidating the preset input confidential information.

10. A non-transitory computer-readable recording medium storing a program for controlling a computer of an apparatus that includes a hardware processor that executes, based on recognized information obtained by voice recognition, a process requiring an execution authority, and an authenticator that performs, using input confidential information that is preset, authentication to determine whether the execution authority has been given, the program causing the computer to function as:

a hardware processor that provides, upon determining that the recognized information corresponds to the preset input confidential information, a user with a predetermined notification regarding security of the preset input confidential information, wherein the predetermined notification includes a prompt to change the preset input confidential information to new confidential information to be used for performing the authentication, and the hardware processor:

detects whether there is a person other than an operator within a predetermined distance from the apparatus, and upon determining that a person other than the operator is detected within the predetermined distance, invalidates the preset input confidential information.

\* \* \* \* \*